(12) United States Patent
Dickson et al.

(10) Patent No.: US 7,163,200 B2
(45) Date of Patent: Jan. 16, 2007

(54) INTERLOCKING MOUNT ASSEMBLY FOR A VEHICLE

(75) Inventors: Daniel G. Dickson, West Bloomfield, MI (US); Thomas E. St. Henry, Ann Arbor, MI (US)

(73) Assignee: BASF Corporation, Florham Park, NJ (US)

( * ) Notice: Subject to any disclaimer, the term of this patent is extended or adjusted under 35 U.S.C. 154(b) by 160 days.

(21) Appl. No.: 11/075,599

(22) Filed: Mar. 9, 2005

(65) Prior Publication Data

US 2006/0202101 A1    Sep. 14, 2006

(51) Int. Cl.
F16F 7/00    (2006.01)
F16M 13/00    (2006.01)

(52) U.S. Cl. .................. 267/141.4; 267/293; 248/635
(58) Field of Classification Search ............. 267/141.2, 267/141.4, 141.5, 293, 294; 248/569, 635, 248/638

See application file for complete search history.

(56) References Cited

U.S. PATENT DOCUMENTS

| | | |
|---|---|---|
| 3,809,427 A | 5/1974 | Bennett |
| 4,286,777 A | 9/1981 | Brown |
| 4,478,396 A | 10/1984 | Kawaura |
| 4,720,075 A | 1/1988 | Peterson et al. |
| 4,783,039 A | 11/1988 | Peterson et al. |
| 4,921,203 A | 5/1990 | Peterson et al. |
| 5,170,985 A * | 12/1992 | Killworth et al. ........... 248/635 |
| 5,178,433 A | 1/1993 | Wagner |
| RE35,123 E | 12/1995 | Wagner |
| 5,570,867 A | 11/1996 | Norkus |
| 5,799,930 A * | 9/1998 | Willett .................... 267/141.4 |
| 6,062,763 A | 5/2000 | Kirois et al. |
| 6,910,671 B1 * | 6/2005 | Norkus et al. .............. 248/635 |
| 2005/0073166 A1 | 4/2005 | Snyder |

* cited by examiner

Primary Examiner—Xuan Lan Nguyen
(74) Attorney, Agent, or Firm—Fernando A. Borrego

(57) ABSTRACT

A mount assembly having a first carrier with a first insulator coupled to a first flange of the first carrier. The mount assembly also includes a second carrier and a second insulator coupled to a second flange of the second carrier. A first locking member, which is formed of a polymeric material, is connected to the first carrier. A second locking member, which is also formed of a polymeric material, is connected to the second carrier with the first locking member engaging the second locking member to retain the first carrier in telescoping relationship with the second carrier.

19 Claims, 4 Drawing Sheets

INTERLOCKING MOUNT ASSEMBLY FOR A VEHICLE

BACKGROUND OF THE INVENTION

1. Field of the Invention

The subject invention relates to body mount assemblies for vehicles wherein the mount assembly interlocks about a frame of the vehicle during installation of the mount assembly.

2. Description of Related Art

Body mount assemblies for vehicles are well known in the art. Examples of such assemblies are shown in U.S. Pat. Nos. 3,809,427; 4,286,777; and 4,720,075. Each of these assemblies include upper and lower insulators for coupling a frame of the vehicle to a vehicle body.

The '427 and '075 patents also include upper and lower cup shaped carriers for supporting the insulators. Each of the carriers includes a tube and a flange with the tubes encapsulating each other to interconnect the lower carrier to the upper carrier. A fastener is then inserted through the tubes to secure the carriers together and to secure the insulators about the frame. It is advantageous to have the carriers be interlocked to each other before the installation of the fastener such that the carriers remain interconnected. The interlocking of the carriers can be accomplished by flaring an end of one of the tubes, such as disclosed in the '427 patent, or by providing a locking washer, such as disclosed in the '075 patent. The prior art mount assemblies that disclose a means to interlock the carriers require additional manufacturing steps, additional installation steps, and/or additional components. Further, the carriers of the prior art mount assemblies are all formed of a metallic material and do not provide any additional isolation of movement as the frame moves relative to the vehicle body.

Accordingly, it would be advantageous to develop a mount assembly that includes interlocking carriers while minimizing the manufacturing steps, installation steps, and/or components and while also isolating movement of the frame relative to the vehicle body.

SUMMARY OF THE INVENTION AND ADVANTAGES

A mount assembly for use with a vehicle having a frame and a vehicle body. The mount assembly comprises a first carrier having a first flange and a first tube. A first insulator is coupled to the first flange of the first carrier for isolating the frame relative to the body of the vehicle. A second carrier has a second flange and a second tube with the second tube telescopingly engaging the first tube. The second insulator is coupled to the second flange of the second carrier for further isolating the frame relative to the vehicle body of the vehicle. A first locking member, which is formed of a polymeric material, is connected to the first carrier. A second locking member, which is also formed of a polymeric material, is connected to the second carrier with the first locking member engaging the second locking member to retain the first carrier in telescoping relationship with the second carrier.

Accordingly, the subject invention provides a mount assembly having polymeric locking members for interconnecting the carriers. The polymeric locking members minimize the manufacturing steps of the carriers, do not increase the installation steps of the mount assembly, and can isolate movement of the frame relative to the vehicle body.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
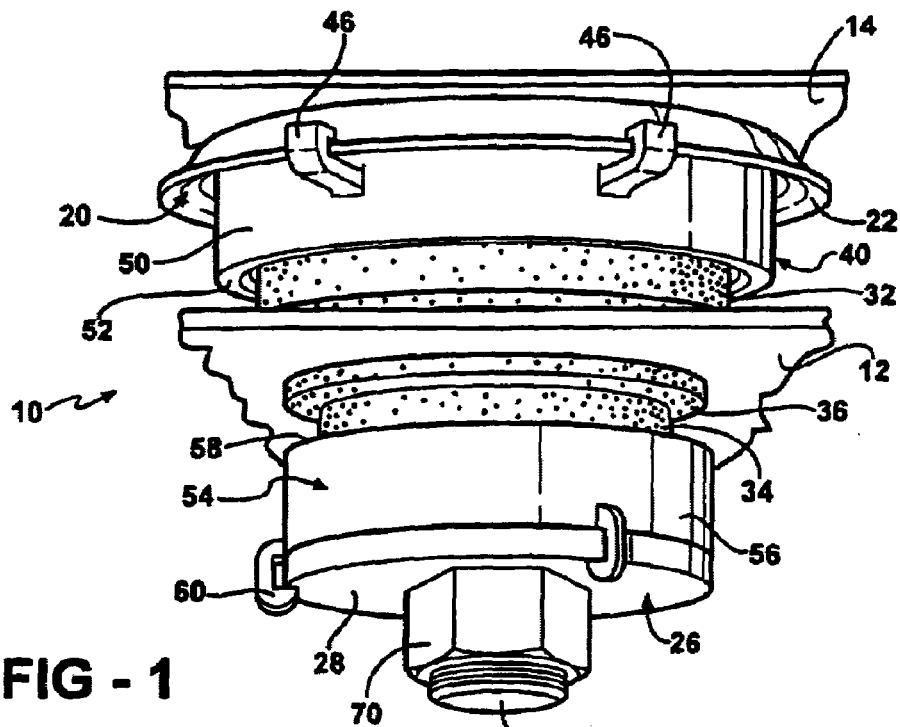
FIG. 1 is a perspective view of a mount assembly in accordance with the subject invention.
Figure 3:
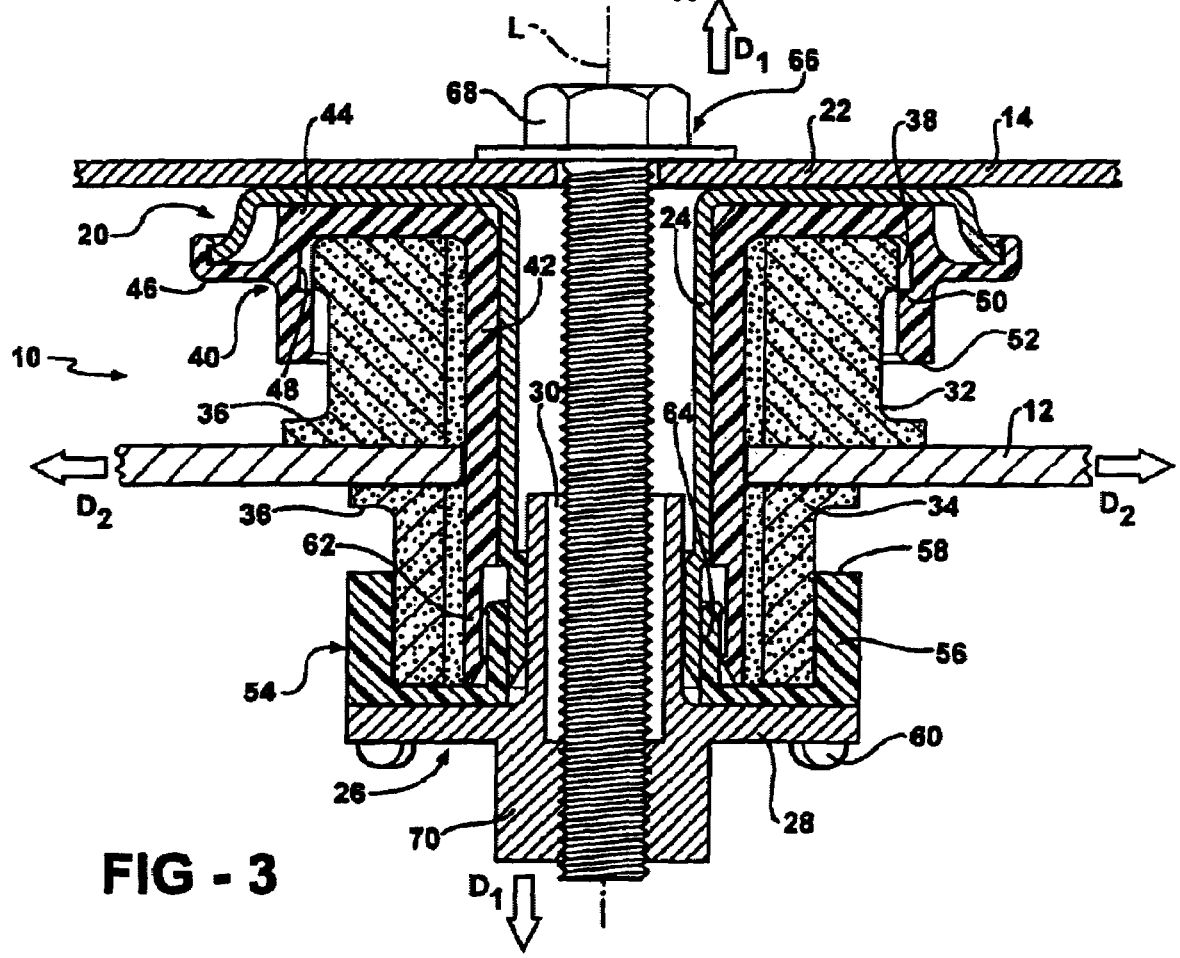
FIG. 3 is a cross-sectional view of the mount assembly.
Figure 2:
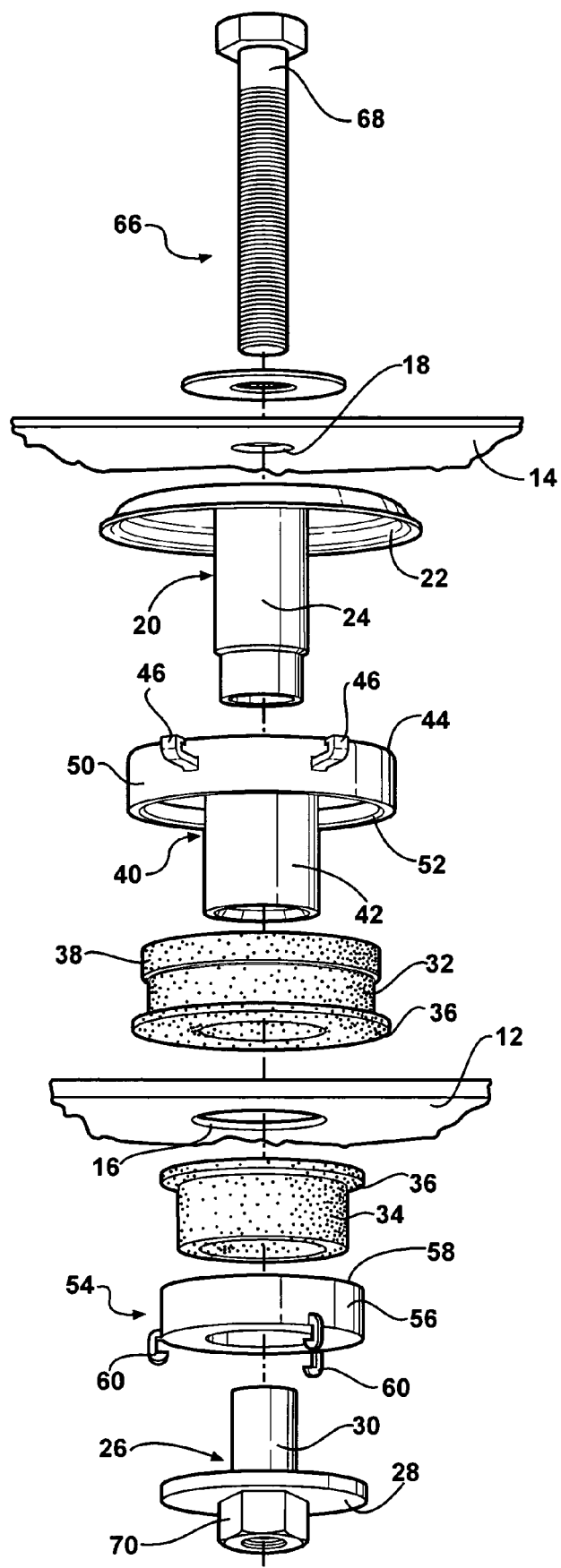
FIG. 2 is an exploded view of the mount assembly.

Referring to the Figures, wherein like numerals indicate like or corresponding parts throughout the several views, a mount assembly is generally shown at 10 in FIGS. 1–3. The mount assembly 10 is shown in a rest state in FIGS. 1 and 3. In the preferred embodiment, the mount assembly 10 is for use with a vehicle having a frame 12 and a vehicle body. Both the frame 12 and vehicle body 14 include apertures 16, 18 that will be discussed in greater detail below. For illustrative purposes, only a small fragment of the frame 12 and vehicle body 14 are shown in the Figures. The frame 12 and vehicle body 14 can be of any suitable design or configuration without deviating from the scope of the subject invention.

The mount assembly 10 includes a first carrier 20 having a first flange 22 and a first tube 24. The first carrier 20 is adapted to be coupled to the frame 12 of the vehicle with the first tube 24 extending through the aperture 16 in the frame 12. The first carrier 20 is preferably formed of a metallic material such as steel. The mount assembly 10 also includes a second carrier 26 having a second flange 28 and a second tube 30 with the second tube 30 telescopingly engaging the first tube 24 for coupling the second carrier 26 to the first carrier 20 and to the frame 12 of the vehicle. The second tube 30 can also extend through the aperture 16 in the frame 12 and the second carrier 26 is also preferably formed of a metallic material such as steel. Preferably, the second tube 30 of the second carrier 26 is telescopingly received within the first tube 24 of the first carrier 20 for coupling the second carrier 26 to the first carrier 20. As illustrated in FIGS. 1–3, the first carrier 20 is located at a top of the assembly 10 with the first flange 22 above the frame 12 and the second carrier 26 is located at a bottom of the assembly 10 with the second flange 28 below the frame 12.

A first insulator 32 is coupled to the first flange 22 of the first carrier 20 for isolating movement of the frame 12 relative to the vehicle body 14 in a first direction $D_1$. A second insulator 34 is coupled to the second flange 28 of the second carrier 26 for further insolating the movement of the frame 12 relative to the vehicle body 14 in the first direction $D_1$. The first 32 and second 34 insulators can include ledges 36 extending outwardly therefrom. The purpose of the ledges 36 will be discussed in detail below. Also, the first insulator 32 can include a projection 38 extending outwardly in a direction substantially parallel to the ledge 36. Preferably, the first 32 and second 34 insulators are formed of an elastomeric material. Even more preferably, the first 32 and second 34 insulators are formed of micro-cellular polyurethane.

As shown in FIG. 3, the frame 12 of the vehicle is displaceable relative to the carriers 20, 26 and vehicle body 14 along a line of travel L. The first direction $D_1$, as indicated by the arrow $D_1$, is substantially parallel to the line of travel L. As orientated in the Figures, the first direction $D_1$ is in a vertical direction. It should be appreciated that the nomenclature of the frame 12 being displaced relative to the vehicle body 14 is purely for descriptive purposes and depending upon the point of reference, the vehicle body 14 could be displaceable relative to the frame 12.

A first locking member 40, which is formed of a polymeric material, is connected to the first carrier 20. The first locking member 40 extends at least partially along the first tube 24 to define a sleeve portion 42. At a minimum, the sleeve portion 42 extends across the aperture 16 in the frame 12 and across a portion of the second carrier 26. Preferably, the first locking member 40 also extends at least partially along the first flange 22 to define an extension portion 44. Preferably, the extension portion 44 is integrally connected to and extends from the sleeve portion 42. The sleeve portion 42 extends along the first tube 24 and the extension portion 44 has a contour substantially similar to the configuration of the first flange 22. The extension 44 and sleeve 42 portions are also preferably formed of a common homogenous material, such as a polyurethane elastomer. Even more preferably, the first locking member 40 is formed of thermoplastic or thermoset polyurethane. The extension portion 44 includes a plurality of first retaining tabs 46 engaging the first flange 22 to interconnect the extension portion 44 and the first locking member 40 to the first carrier 20. As such, the first locking member 40 remains attached to the first carrier 20 during installation of the first carrier 20 into the assembly 10.

The first insulator 32 abuts the extension portion 44 of the first locking member 40 for coupling the first insulator 32 to the first flange 22. In particular, the first locking member 40 defines a first pocket for receiving the first insulator 32. The first locking member 40 includes an integral notch 48 and a complementary configured projection 38 of the first insulator 32 is aligned with the notch 48. The first insulator 32 is therefore partially press fit into the first pocket such that the first insulator 32 remains attached to the first locking member 40 during installation of the mount assembly 10. The first locking member 40 also includes a first wall 50 extending away from the first flange 22 of the first carrier 20 and defining an abutment end 52 of the first wall 50. The first wall 50 at least partially surrounds the first insulator 32 for further defining the first pocket and for coupling the first insulator 32 to the first carrier 20. The abutment end 52 of the first wall 50 selectively engages the ledge 36 of the first insulator 32 during excessive movement of the frame 12 relative to the vehicle body 14 in the first direction $D_1$ to further isolate movement of the frame 12 relative to the vehicle body 14. It should be appreciated that the notch 48, projection 38, and wall 50 could be eliminated without deviating from the scope of the subject invention.

A second locking member 54, which is also formed of a polymeric material, is connected to the second carrier 26 with the first locking member 40 engaging the second locking member 54 to retain the first carrier 20 in telescoping relationship with the second carrier 26. The second locking member 54 similarly extends at least partially along the second tube 30 and extends at least partially along the second flange 28. The second locking member 54 preferably has a cup-shaped configuration defining a second pocket for receiving the second insulator 34. The second insulator 34 is also press fit into the second pocket such that the second insulator 34 remains attached to the second locking member 54 during installation of the mount assembly 10. The cup-shaped second locking member 54 includes a second wall 56 extending away from the second flange 28 for defining an abutment end 58 of the second wall 56. It should be appreciated that the pocket and second wall 56 of the second locking member 54 could also be eliminated without deviating from the scope of the subject invention.

In the embodiment illustrated, the second insulator 34 preferably abuts the second locking member 54 for coupling the second insulator 34 to the second flange 28. The second wall 56 at least partially surrounds the second insulator 34 for further coupling the second insulator 34 to the second flange 28. The abutment end 58 of the second wall 56 selectively engages the ledge 36 of the second insulator 34 during excessive movement of the frame 12 relative to the vehicle body 14 in the first direction $D_1$ to further isolate movement of the frame 12 relative to the vehicle body 14.

The cup-shaped second locking member 54 includes a plurality of second retaining tabs 60 engaging the second flange 28 to interconnect the second locking member 54 to the second carrier 26. The second locking member 54 will therefore remain secured to the second carrier 26 during installation of the second carrier 26 to the assembly 10. The second locking member 54 is preferably formed of a thermoplastic or thermoset polyurethane.

The first 40 and second 54 locking members, which are connected to the first 20 and second 26 carriers, respectively, are designed to interconnect the first 20 and second 26 carriers during installation of the mount assembly 10 about the frame 12 of the vehicle. There is preferably no device or mechanism on the carriers 20, 26 themselves to interconnect the carriers 20, 26. The tubes 24, 30 of the carriers 20, 26 are smooth bores that can encapsulate each other.

Figure 3A:
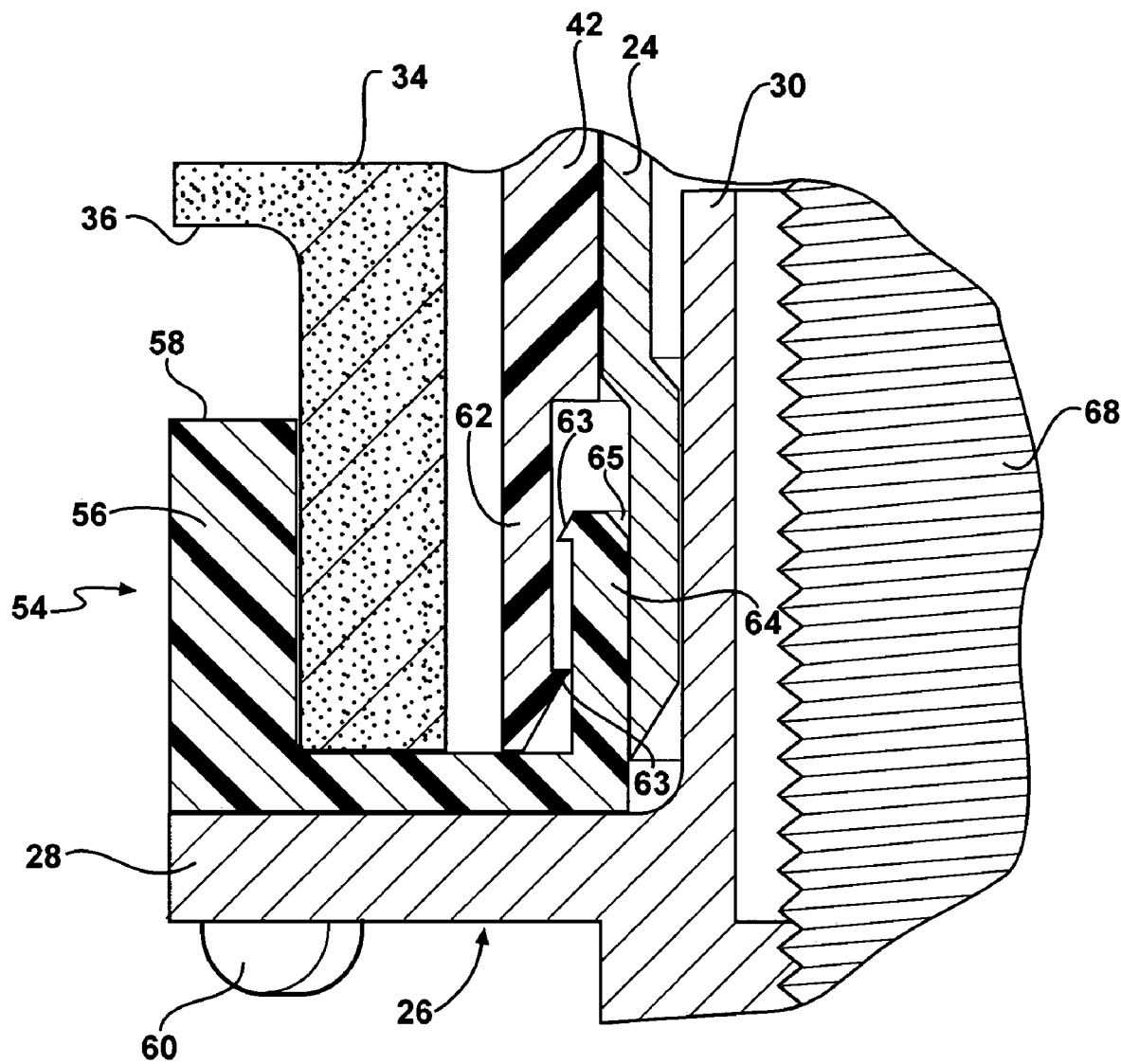
FIG. 3A is an enlarged cross-sectional view of first and second locking members.
Figure 4:
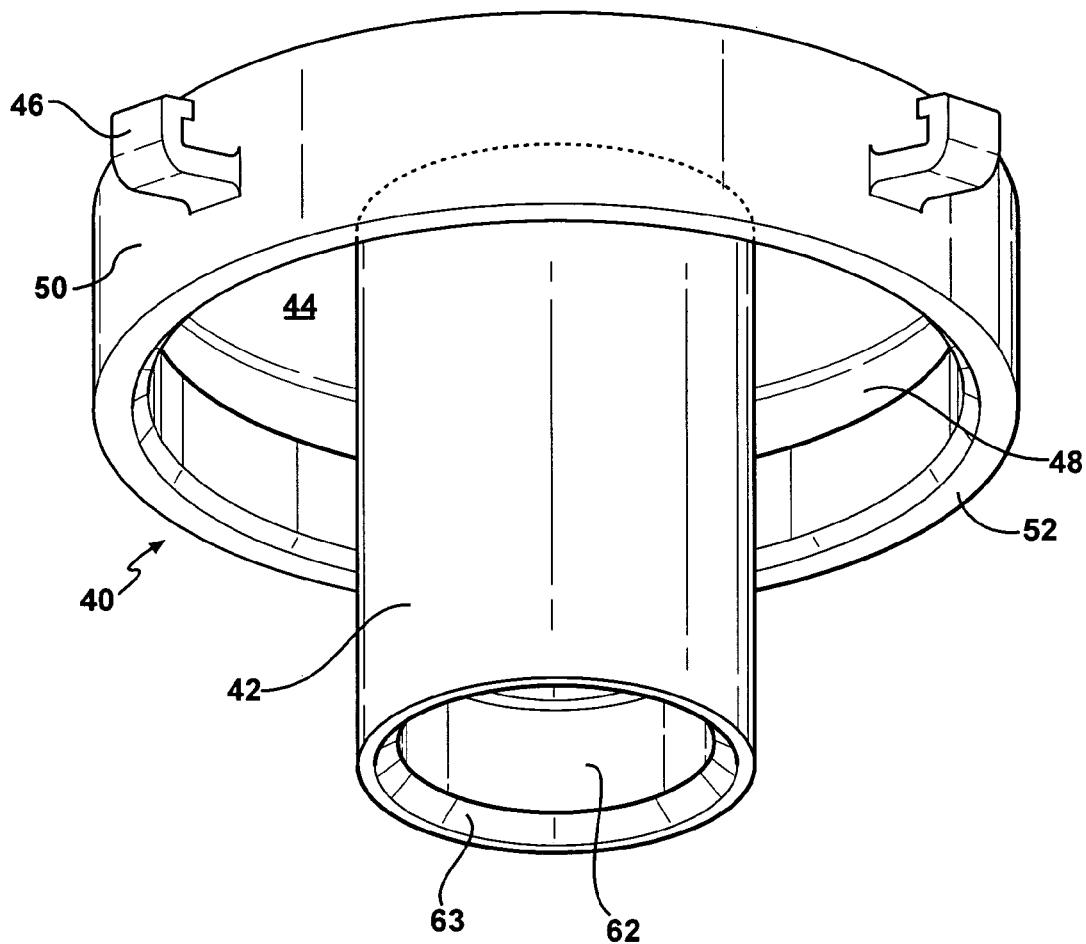
FIG. 4 is a perspective view of the first locking member.
Figure 5:
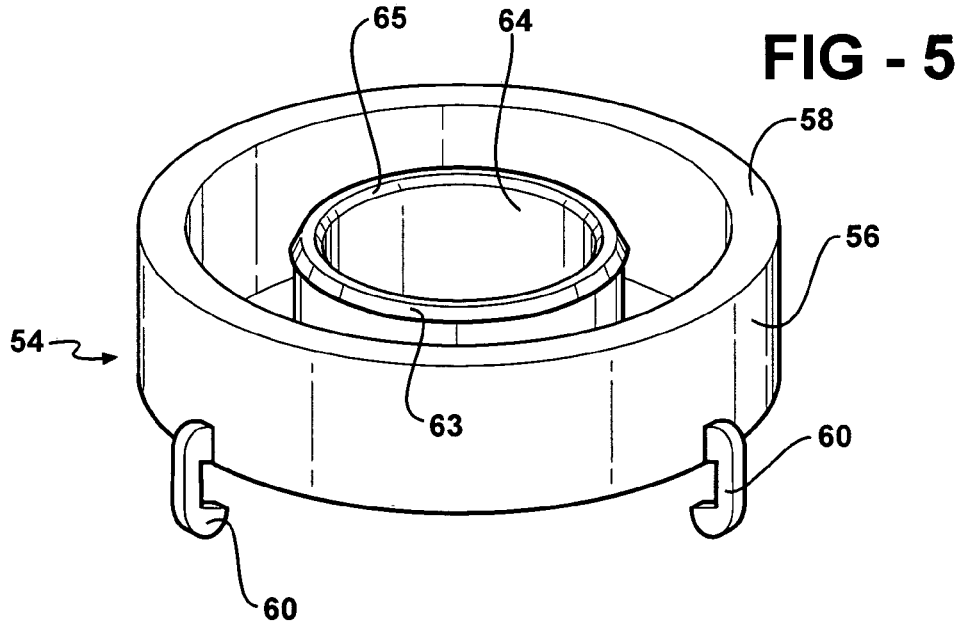
FIG. 5 is a perspective view of the second locking member.

In order to facilitate the interconnection of the first 20 and second 26 carriers, the first locking member 40 preferably includes a first locking finger 62 and the second locking member 54 preferably includes a second locking finger 64 engaging the first locking finger 62 to retain the first 20 and second 26 carriers together. The locking fingers 62, 64 are best shown in FIGS. 3–5. The first locking finger 62 is disposed at a distal end of the sleeve portion 42 and the second locking finger 64 is disposed at a distal end of one side of the cup-shaped second locking member 54. The first 62 and second 64 locking fingers each include a barb 63 at an end thereof and the locking fingers 62, 64 may include a sloping surface at a leading edge. In the most preferred embodiment, the locking members 40, 54 and the locking fingers 62, 64 are substantially annular with the first 62 and second 64 locking fingers telescopingly engaging each other. As best shown in FIG. 3A, the second locking member 54 also includes a chamfer 65 disposed on an inner wall opposite from the second locking finger 64.

The first 62 and second 64 locking fingers are spaced from the first 24 and second 30 tubes, respectively, for facilitating the telescoping engagement. The first tube 24 includes a reduced diameter section and the first locking finger 62 includes a thinner section for providing the spacing between the first tube 24 and the first locking finger 62. The second locking finger 64 extends from the second flange 28 and is spaced from and parallel to the second tube 30. The first tube 24 can therefore be positioned between the second locking finger 64 and the second tube 30. During insertion of the first tube 24, a distal end of the first tube 24, which can be sloped, engages the chamfer 65 on the second locking member 54 to assist in guiding the distal end of the first tube 24 between the second locking finger 64 and the second tube 30. Then the second locking finger 64 can lock into the space defined between the first tube 24 and the first locking finger 62. In particular, the barb 63 on the first locking finger 62 engages the barb 63 on the second locking finger 64. This interengagement interconnects the first carrier 20 to the second carrier 26 to hold the carriers 20, 26, locking members 40, 54 and insulators 32, 34 about the frame 12 of the vehicle.

A fastener 66 is then inserted through the tubes 24, 30 of the carriers 20, 26 to retain the interconnection of the first carrier 20 to the second carrier 26 and to secure both carriers 20, 26 to the vehicle body 14. In the mounted position to the vehicle body 14, such as shown in FIG. 3, the first 40 and second 54 locking members slide relative to each other such that the barbs 63 are no longer in engagement. The leading edge of the first locking finger 62 engages the second locking member 54. The vehicle body 14, first 20 and second 26 carriers, first 40 and second 54 locking members, and fastener 66 therefore move in unison with the movement of the vehicle body 14 relative to the frame 12. The fastener 66 is illustrated as a bolt 68 having a nut 70 wherein the nut 70 is mounted to or integral with the second carrier 26 on an opposing side of the frame 12 from the vehicle body 14. The bolt 68 is threaded into the nut 70 to fixedly secure the first carrier 20 to the second carrier 26. It should be appreciated that the fastener 66 may be of any suitable design or configuration. Also, the bolt 68 and nut 70 could be inverted such that the nut 70 abuts the vehicle body 14.

As best shown in FIG. 3, the first 32 and second 34 insulators remain disposed above and below the frame 12 and do not extend through the aperture 16 of the frame 12. Hence, only the first 24 and second 30 tubes and the sleeve portion 42 extend through the aperture 16. The sleeve portion 42 preferably surrounds the first tube 24 of the first carrier 20 such that the sleeve portion 42 operates as another insulator disposed between the carriers 20, 26 and the frame 12 independently from the first 32 and second 34 insulators. The elastomeric sleeve portion 42 of the first locking member 40 isolate movement of the frame 12 relative to the vehicle body 14 in a second direction $D_2$ transverse to the first direction $D_1$. The second direction $D_2$, as indicated by the arrow $D_2$, is substantially transverse to the line of travel L. As orientated in the Figures, the second direction $D_2$ is in a fore/aft or lateral direction. The isolation of movement about the first $D_1$ and second $D_2$ directions are accomplished by separate and independent components of the mount assembly 10. Of course, angular movement of the frame 12 relative to the line of travel L will be isolated by a combination of the first 32 and second 34 insulators and the sleeve portion 42.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mount assembly for use with a vehicle having a frame and a vehicle body, said assembly comprising:
    a first carrier having a first flange and a first tube;
    a first insulator coupled to said first flange of said first carrier for isolating the frame relative to the body of the vehicle;
    a second carrier having a second flange and a second tube with said second tube telescopingly engaging said first tube;
    a second insulator coupled to said second flange of said second carrier for further isolating the frame relative to the vehicle body;
    a first locking member formed of a polymeric material and connected to said first carrier; and
    a second locking member formed of a polymeric material and connected to said second carrier with said first locking member engaging said second locking member to retain said first carrier in telescoping relationship with said second carrier.

2. An assembly as set forth in claim 1 wherein said first locking member extends at least partially along said first tube.

3. An assembly as set forth in claim 2 wherein said first locking member extends at least partially along said first flange.

4. An assembly as set forth in claim 3 wherein said first locking member includes a plurality of first retaining tabs engaging said first flange to interconnect said first locking member to said first carrier.

5. An assembly as set forth in claim 2 wherein said second locking member extends at least partially along said second tube.

6. An assembly as set forth in claim 5 wherein said second locking member extends at least partially along said second flange.

7. An assembly as set forth in claim 6 wherein said second locking member includes a plurality of second retaining tabs engaging said second flange to interconnect said second locking member to said second carrier.

8. An assembly as set forth in claim 5 wherein said first locking member includes a first locking finger and said second locking member includes a second locking finger engaging said first locking finger to retain said first and second carriers together.

9. An assembly as set forth in claim 8 wherein said locking members and said locking fingers are substantially annular with said first and second locking fingers telescopingly engaging each other.

10. An assembly as set forth in claim 9 wherein said first and second locking fingers are spaced from said first and second tubes, respectively, for facilitating said telescoping engagement.

11. An assembly as set forth in claim 10 wherein said first tube includes a reduced diameter section and said first locking finger includes a thinner section for providing said spacing between said first tube and said first locking finger.

12. An assembly as set forth in claim 10 wherein said second locking finger extends from said second flange and is spaced from and parallel to said second tube.

13. An assembly as set forth in claim 1 wherein said first locking member defines a first pocket for receiving said first insulator.

14. An assembly as set forth in claim 13 wherein said first locking member includes an integral notch and said first insulator includes a complementary configured projection aligned with said notch.

15. An assembly as set forth in claim 13 wherein said second locking member defines a second pocket for receiving said second insulator.

16. An assembly as set forth in claim 1 wherein said first and second insulators are formed of a elastomeric material.

17. An assembly as set forth in claim 16 wherein said first and second insulators are formed of micro-cellular polyurethane.

18. An assembly as set forth in claim 1 wherein said first and second carriers are formed of a metallic material.

19. An assembly as set forth in claim 18 wherein said first and second locking members are formed of thermoplastic polyurethane.

* * * * *